Jan. 4, 1927.
A. W. WEIMER ET AL
1,613,070
BATTERY CONNECTION
Filed August 26, 1924
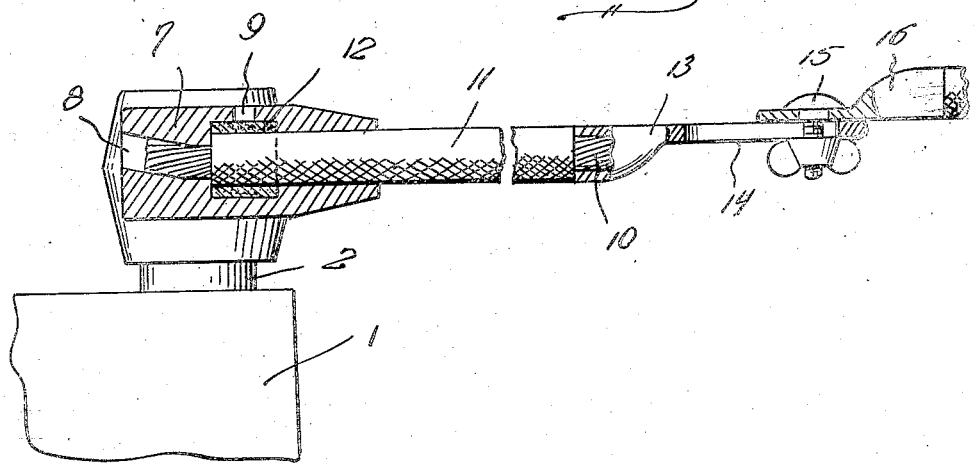
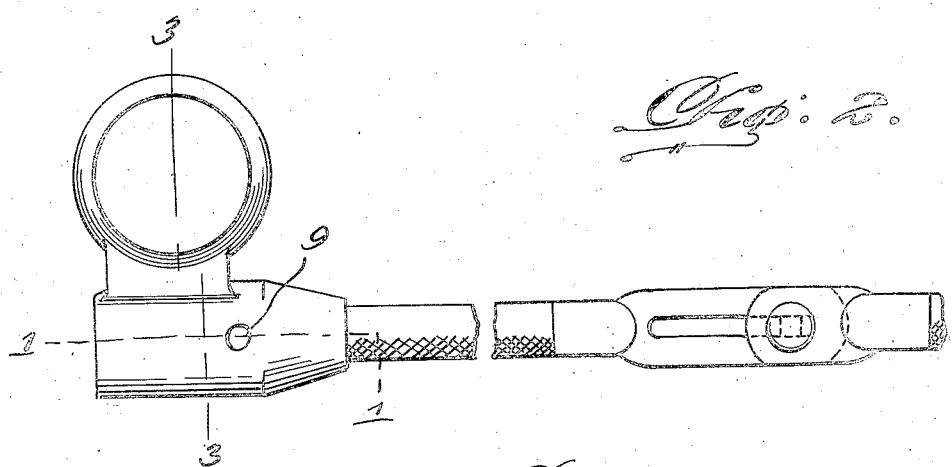
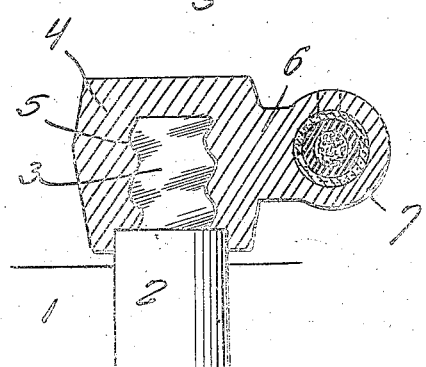
A. W. Weimer,
Jacob Smith,
Inventors
By Clarence A. O'Brien
Attorney Patented Jan. 4, 1927.

1,613,070

UNITED STATES PATENT OFFICE.

ALBERT W. WEIMER AND JACOB SMITH, OF GENESEO, ILLINOIS; SAID WEIMER ASSIGNOR TO WALTER PARSON, OF GENESEO, ILLINOIS.

BATTERY CONNECTION.

Application filed August 26, 1924. Serial No. 734,263.

This invention relates to storage battery connections and it consists in the novel features hereinafter described and claimed.

An object of the invention is to provide simple and efficient means for connecting cable terminals with a storage battery or other electrical device in which the cable is subjected to the deteriorating action of acids or other chemicals.

The invention consists primarily in an improved terminal which is of such character as to prevent any deteriorating action taking place.

In the accompanying drawing:—

Figure 1 is a side elevation of the battery connection with parts thereof shown in section and cut on the line 1—1 of Figure 2.

Figure 2 is a top plan view of the battery connection.

Figure 3 is a transverse sectional view thereof cut on the line 3—3 of Figure 2.

As illustrated in the accompanying drawing the battery is indicated at 1 and the said battery is provided with a usual post 2 having at its upper end a threaded stud 3. The connection proper comprises a head 4 having a threaded socket 5 adapted to receive the stud 3. The head 4 is provided at one side with a neck portion 6 having at its outer end a sleeve 7. The bore 8 through the sleeve 7 is provided with angularly disposed end portions and an opening 9 passes through the top side of the sleeve 7 and communicates at its inner end with the bore 8 in the sleeve.

The battery connection also includes a cable section 10 covered by a sheathing 11 and one end portion of the cable section and the sheathing is inserted in the bore 8 of the sleeve and an extremity of the cable extends into the angularly disposed end portion of the said bore and the strands of wire of the cable are in direct contact with the surfaces of the bore. A sealing agent 12 such as any suitable grease or the like is poured into the sleeve through the opening 9 and completely surrounds the sheathing 11 at a point between the ends of the sleeve. Such a sealing agent may also be poured into the angularly disposd outer end portion of the bore 8 whereby the end of the cable 10 is sealed within the sleeve. A plate 13 is connected with the outer end of the cable 10 and is provided with a slot 14 which receives a clamp screw 15 connected with a fitting 16 which is adapted to be attached to the electric conducting wire (not shown).

By reason of the structure hereinbefore described it will be seen that the parts are protected against corrosion and deterioration and action of the battery acids. The battery may be readily detached without the use of tools. The terminals will last for an indefinite length of time and the terminals are positively held at all times in proper contact. The parts may be made of lead and thus are of such character as to be unaffected by contact with the electrolyte of the battery.

Having thus described the invention, what we claim is:—

A battery connection comprising a head having a socket and a sleeve, said sleeve being offset from the head, the median longitudinal dimension of the sleeve being perpendicularly disposed to the axis of the socket of the head, said sleeve being provided with a bore which traverses the length thereof, said bore having one portion axially alined with the sleeve and another portion angularly disposed to the axis of the other portion and to extend upwardly therefrom, the juncture of the bores being larger in diameter than the remaining portions of the bores, the first bore being larger in diameter than the second bore, said sleeve provided with an opening leading upwardly from the juncture of the bores through the top of the sleeve.

In testimony whereof we affix our signatures.

ALBERT W. WEIMER.
JACOB SMITH.